Figure 1:
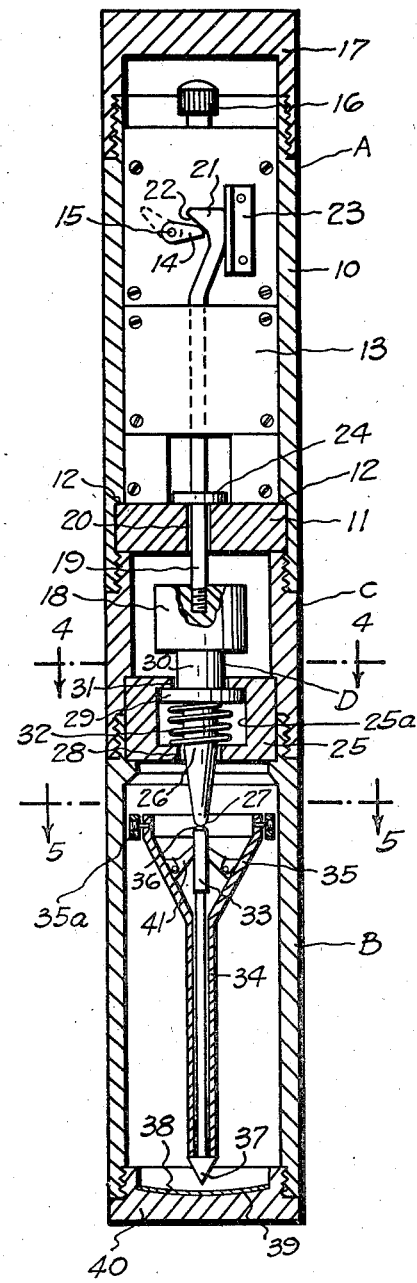

Sept. 21, 1948.  F. H. SCHMIDT  2,449,674
INCLINATION INDICATING DEVICE
Filed July 12, 1945  2 Sheets-Sheet 1

Fred H. Schmidt
INVENTOR.

BY Jos E. Edwards
ATTORNEY

Sept. 21, 1948.  F. H. SCHMIDT  2,449,674
INCLINATION INDICATING DEVICE
Filed July 12, 1945  2 Sheets-Sheet 2

Fred H. Schmidt
INVENTOR.

BY Jod E. Edwards
ATTORNEY

Patented Sept. 21, 1948

2,449,674

UNITED STATES PATENT OFFICE 2,449,674

INCLINATION INDICATING DEVICE

Fred H. Schmidt, Dallas, Tex., assignor, by direct and mesne assignments, to Eastman Oil Well Survey Company, Denver, Colo., a corporation of Delaware Application July 12, 1945, Serial No. 604,653

7 Claims. (Cl. 33—205.5)

This invention relates to new and useful improvements in inclination indicating devices.

It is well known that in the drilling of wells it is not unusual for the drill bit to be deflected from its intended course during the drilling operation and it has become the general practice to employ various types of inclination indicating instruments for periodically checking the angle of deviation from vertical of the well bore as it is being drilled. Certain of these instruments employ various types of photographic means while others employ mechanical marking devices which are controlled by suitable timing mechanisms to cause operation of the instruments to produce the records at the desired elevation within the well bore. The use of an inclination indicating instrument during the drilling operation has become recognized as substantially essential to proper well drilling.

It is one of the objects of the present invention to provide an improved device which will accurately indicate and record the deviation or "drift" of a well bore hole from the vertical, whereby the drilling may be performed in accordance with the indications obtained to maintain the drilling in a desired course.

Another object of the invention is to provide an improved inclination or drift indicator of a mechanical type whereby the use of photographic paper, together with its inherent disadvantages, is eliminated.

An important object of the invention is to provide an improved inclination indicating instrument wherein a disk or other element is adapted to be marked by a mechanical marking means, with the position of the latter being controlled by a pendulum or plumb bob; the actuation of the marking element being controlled by a suitable timing mechanism, whereby the device may be preset and lowered into the well bore and the marking element automatically actuated when the device reaches the desired elevation within the said bore.

A particular object of the invention is to provide an improved drift indicator, of the character described, wherein the marking element is normally held in an inactive or raised position by means of a magnet which is normally acting thereon, together with means for removing the element from the magnetic influence of the magnet, whereby said element may move downwardly into engagement with the disk or record to thereby mark the same and indicate the degree of deviation of the well bore at the point at which the element is actuated.

Still another object of the invention is to provide an instrument of the character described having a movable magnet controlled by a timing mechanism; said magnet normally holding the marking element in an inactive position by means of its magnetic influence and releasing the marking element from its influence upon movement of the magnet to allow actuation or downward movement of said element by gravity.

The construction designed to carry out the invention will be hereinafter described together with other features of the invention.

Figure 2:
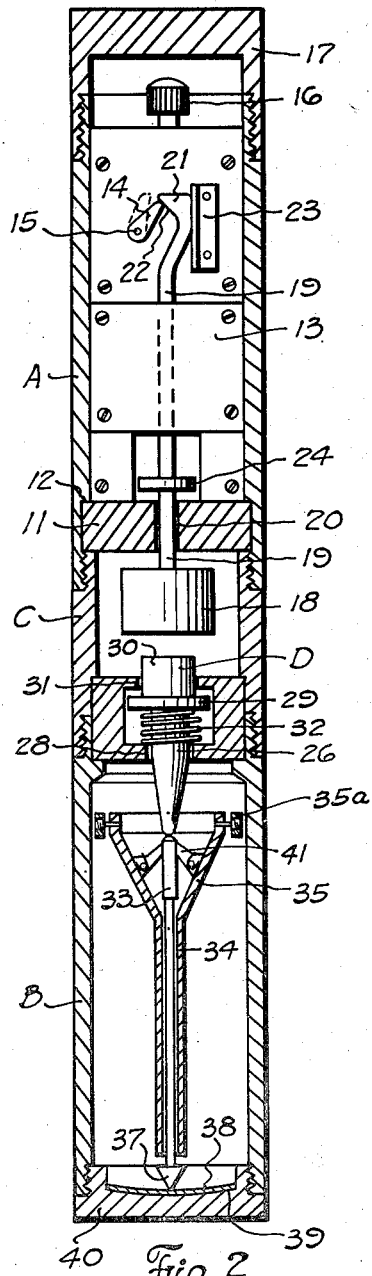
Figure 3:
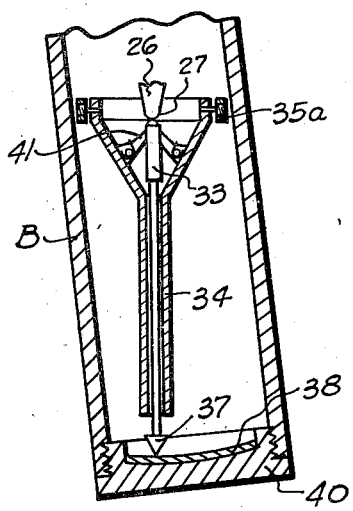
Figure 6:
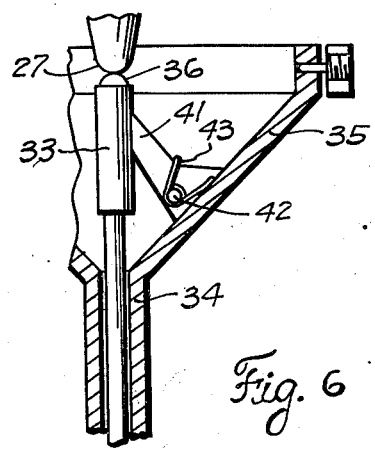
Figure 4:
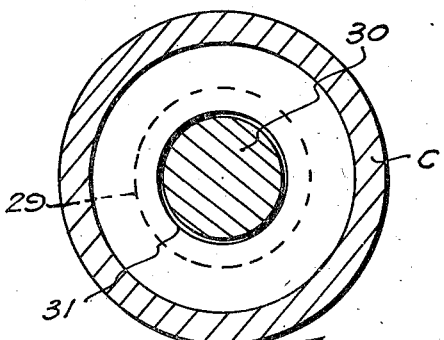
Figure 5:
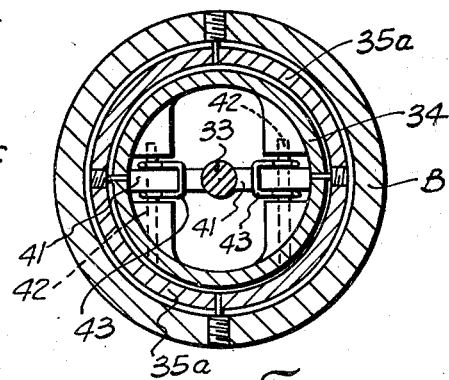
Figure 7:
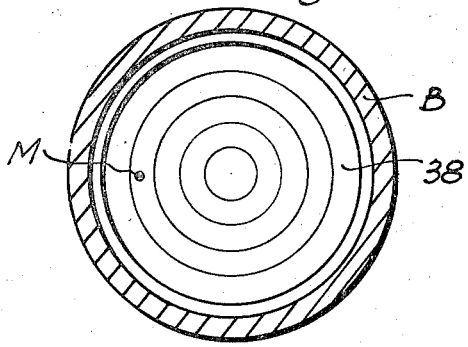

The invention will be more readily understood from a reading of the following specification and by reference to the accompanying drawing, wherein an example of the invention is shown, and wherein:

Figure 1 is a view partly in section and partly in elevation of an inclination indicating instrument, constructed in accordance with the invention, and showing the marking element in an inactive position, Figure 2 is a similar view with the magnet separated from the plumb bob assembly and with the marking element engaged with the record disk, Figure 3 is a view of the lower portion of the instrument and illustrating the position of the plumb bob and marking element when the instrument is lowered in an inclined well bore, Figure 4 is an enlarged, horizontal, cross-sectional view taken on the line 4—4 of Figure 1, Figure 5 is an enlarged, horizontal, cross-sectional view taken on the line 5—5 of Figure 1, Figure 6 is an enlarged detail of the upper portion of the plumb bob assembly and illustrating one of the frictional holding members, and, Figure 7 is a plan view of the record disk.

In the drawings the numeral 10 designates a tubular housing or casing which is constructed of an upper tubular section A, a lower tubular section B and an intermediate connecting section C. A transversely extending supporting element 11 is mounted within the housing or casing and is preferably clamped between an internal shoulder 12 formed in the lower portion of the upper section A and the extreme upper edge of the intermediate section C. A timing mechanism or watch 13 is disposed within the upper section A and rests upon the support 11. The timing mechanism or watch may be of any desired construction and is provided with an operating arm 14 which is mounted upon a shaft 15, said shaft being controlled in its rotation by the timing mechanism (not shown), whereby the arm 14 will make one revolution during a predetermined time interval. The timing mechanism has the usual setting and winding stem 16 and after the watch is in position within the upper section A of the housing or casing, a suitable cap 17 threads onto the housing to close its upper end.

A magnet 18 is disposed within the intermediate section C of the casing 10 and is secured to the lower end of an operating rod 19. The rod 19 extends upwardly through an opening 20 in the transversely extending support 11 and has its extreme upper end formed with a cam head 21. The cam surface 22 of the head 21 is located in the path of the actuating arm 14 so that as said arm rotates in a counter-clockwise direction (Figures 1 and 2) due to its operation by the timing mechanism, said arm will engage the cam surface to impart a lifting to the operating rod 19. As the rod 19 is raised the magnet 18 will be raised within the housing from the position shown in Figure 1 to that shown in Figure 2.

The upper portion of the rod 19 is guided in its vertical movement by an angular guide rail 23 which is secured to the outer plate of the timing mechanism and downward movement of the rod is limited by an annular flange or collar 24 which is secured to said rod and which is adapted to engage the upper surface of the support 11 (Figure 1). By properly setting the timing mechanism it is obvious that the time interval which elapses between the setting and the actual lifting of the rod 19 and magnet 18 may be controlled.

The magnet 18 is arranged to coact with a pick-up member D which is mounted within a block 25 located within the casing 10 at the joint between the intermediate section C and the lower section B of said casing. The pick-up member comprises a generally cylindrical body 26 having its lower portion tapered with its extreme lower end rounded as shown at 27. The body is movable within a chamber 25a in the block and its lower end projects downwardly through a reduced opening 28 in the block 25. An enlarged annular flange 29 is preferably formed integral with the upper portion of the body and above the flange, a cylindrical head 30 which is secured to or integral with said flange extends upwardly through a reduced opening 31 in the top of the block. The enlarged flange 29 and body portion 26 is movable within the chamber 25a and a light coil spring 32 which surrounds the body 26 and which is confined between the underside of the flange 29 and the bottom of the chamber constantly urges the member D upwardly toward the magnet 18.

It will be evident that when the head 30 of the member D is within the field of the magnet 18, said head will be drawn into contact with said magnet. As the magnet 18 is moved upwardly away from the head 30 to a position where the head is outside of its magnetic influence, the member D will move downwardly within the block 25. The coil spring 32 is not sufficient to support the weight of the member and therefore as soon as the magnet 18 is lifted to release the head 30, the member will move downwardly. It is noted that upward movement of the body 26 is limited by the external shoulder 29 striking the upper end of the chamber 25a within the supporting block 25. It is preferable that the pick-up member be constructed of a material capable of conducting a magnetic current and yet not capable of retaining permanent magnetism when the magnet 18 is separated therefrom.

The pick-up member 26 has its lower end coacting with a marking plunger 33 which plunger is slidable within a tubular plumb bob 34, the latter being disposed within the lower section B of the casing. The upper end of the plumb bob is flared outwardly as shown at 35 and is mounted upon the usual gimbal rings 35a, whereby the plumb bob may undergo universal movement within the casing. The upper end of the marking plunger 33 is rounded as indicated at 36 and is normally in contact with the rounded lower end 27 of the pick-up element 26. Thus, when the magnet is engaging the pick-up member the magnetism is conducted through the member 26 and to the marking plunger 33, whereby said plunger is held in its raised or lifted position. In such position the lower pointed end 37 of the plunger is spaced above a record disk 38 which is supported within a recess 39 of a disk carrier or support 40. The support 40 is in the form of an inverted cap which threads into the lower end of the section B of the casing to close the lower end of said casing.

Accidental displacement of the marking plunger 33 from its contact with the pick-up member 26 is prevented by a pair of pivoted holding elements or dogs 41. As is clearly shown in Figures 5 and 6 each dog is pivoted on a shaft 42 and has its outer upper end frictionally engaging the outer surface of the plunger 33. A spring 43 is associated with each dog and constantly urges the same inwardly into engagement with the plunger. The frictional engagement of the dogs with said plunger prevent undue vibration thereof during lowering of the instrument through a well bore and thereby accidental disengagement of the plunger from the pick-up member 26 is prevented.

It will be apparent that when the magnet 18 is lifted to disengage the pick-up member, the magnetism which is normally conducted through said member is dissipated and the marking plunger and member may move longitudinally downwardly within the casing. This moves the sharp pointed end 37 of the marking plunger 33 into contact with the record disk 38 to form a dot or mark M (Figure 7) on said disk. This mark will, of course, be in accordance with the position of the marking plunger within the casing as controlled by the position of the plumb bob.

The disk may be of such material as to be readily marked by the metallic end of the plunger or if desired the tip of the plunger may be of a special marking material. If the casing is within a truly vertical bore, the plumb bob 34 and plunger 33 will be aligned with the longitudinal axis of the casing and the mark made by said plunger will be at the center of the disk 38; however, if the casing is within an inclined bore, said casing will be inclined from a vertical position but the plumb bob 34 will hang vertically so that the marking point 37 of the plunger will be off center of the disk, as indicated in Figure 3. The amount or degree of misalignment of the marking end of the plunger with the disk will be in accordance with the degree of inclination of the instrument and therefore, of the well bore. Thus, when the marking plunger is actuated the mark M formed thereby will be representative of the number of degrees of inclination of the well bore at the elevation that the record is made.

The operation of the device is believed to be obvious. The parts are assembled as shown in Figure 1 and the timing mechanism 13 is set to locate the actuating arm 14 at a desired position to assure sufficient time for the instrument to be lowered to the elevation at which a record is to be made. Assuming that it requires 30 minutes for the arm 14 to make one complete revolution and further assuming that 15 minutes will be required to lower the instrument to the desired elevation, the arm 14 would be set in approximately the position shown in dotted lines in Figure 1. In such position it would require approximately 20 minutes before said arm, moving in a counter-clockwise direction would engage the cam surface 22 and accomplish a lifting of the magnet rod 19. After setting of the timing mechanism the instrument is lowered into the well to the position at which the record is to be made and is allowed to remain at rest at this point.

In the event that the bore is inclined at this elevation, the instrument will also be inclined and the plumb bob and plunger will hang vertically so that the marking end 37 of said plunger is located off center of the disk 38. During the lowering operation the frictional engagement of the spring pressed dogs 41 with the plunger 33 will prevent undue vibration thereof and since the magnet 18 engages the pick-up member 26, the plunger 33 is held in a raised or lifted position.

As the actuating arm rotates into engagement with the cam surface 22 of the actuating rod 19, said rod is lifted upwardly to raise the magnet 18 upwardly away from the pick-up member 26. Upward movement of the pick-up member is prevented by the engagement of its external flange 29 with the upper end of the chamber 25a of the supporting block and continued upward movement of the magnet separates said magnet and the pick-up member sufficiently to move the latter out of the influence of said magnet. When this occurs, the pick-up member 26, together with the marking plunger 33 moves downwardly and this causes the point of the marking plunger to mark the recording disk. Such marking as has been explained indicates the degree of inclination of the well bore at the elevation that the record is made.

The marking plunger remains in engagement with the disk until the actuating arm rotates sufficiently to disengage the cam surface 22, which position of said arm is indicated in dotted lines in Figure 2. As the arm 14 disengages the cam surface, the actuating rod 19 is lowered by gravity, whereby the magnet 18 is again moved downwardly to the position shown in Figure 1 and this position again places the pick-up member 26 within the field of said magnet. Thus, the pick-up member is raised into engagement with the magnet and since said element conducts the magnetic current, the plunger 33 is again lifted and the parts return to the position shown in Figure 1. The instrument is then removed from the well and during such removal the plunger 33 is maintained out of engagement with or spaced above the disk 38.

It will be evident that the instrument provides a simple type of drift indicator which is sturdy in construction and which comprises a minimum number of parts. The device does not employ any photographic disks whereby the inherent disadvantages thereof, such as the necessity of developing said disks, are eliminated. Although a permanent magnet is illustrated it is apparent that an electro-magnet could be employed and the timing mechanism utilized to actuate a switch for closing the electrical circuit to such magnet. The use of the pick-up member 26 which is disposed between the magnet 18 and the plunger provides an arrangement whereby there is substantially no resistance to the movement of said plunger as controlled by the plumb bob and in this manner a very accurate indication will be obtained.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An inclination indicating device including, a casing adapted to be lowered through a well bore, a record disk mounted in the lower portion of the casing, a longitudinally movable marking element above the disk and adapted to move downwardly into engagement therewith to mark the same, means for mounting said element to undergo universal movement within the casing whereby its position relative to the center of the disk is controlled by gravity, a permanent magnet mounted to undergo longitudinal movement within the casing and adapted to act upon the marking element for normally maintaining the same in a raised position spaced above the disk, and means for imparting movement to said magnet to remove the marking element from the influence thereof and thereby allow said element to drop by gravity into engagement with the disk to mark the same.

2. An inclination indicating device as set forth in claim 1, wherein the last named means also functions to again move the magnet to reestablish its influence on said marking element to lift the same after the marking operation has been completed.

3. An inclination indicating instrument as set forth in claim 1, wherein the last named means is controlled by a timing mechanism, whereby the marking element may be actuated at any desired predetermined time.

4. An inclination indicating instrument including, a casing adapted to be lowered within a well bore, a record disk mounted in the lower portion of the casing, a tubular plumb bob suspended for universal movement within the casing above said disk, a marking element mounted in the plumb bob and movable longitudinally therethrough, said element being normally spaced above the disk and movable downwardly into engagement with the disk to mark the same, a pick-up member mounted for longitudinal movement within the casing and having its lower end engaging the upper end of the marking element, a permanent magnet above the pick-up member and also movable longitudinally within the casing, said magnet normally engaging the pick-up member and through the magnetic current conducted by said member normally maintaining the marking element in a raised position, and means for raising the magnet away from the pick-up member to remove said member and the marking element from its magnetic influence, whereby the marking element may drop into engagement with the disk to mark the same, such marking being in accordance with the position of the marking element as controlled by the plumb bob.

5. An inclination indicator as set forth in claim 4, together with means for returning the magnet into engagement with the pick-up member after the marking operation is complete, whereby said marking element is returned to its raised position above the disk.

6. An inclination indicator as set forth in claim 4, together with a timing mechanism for controlling the magnet-moving means, whereby the marking element may be released to perform the marking operation at a desired predetermined time.

7. An inclination indicating device including, a casing adapted to be lowered through a well bore, a record disk mounted in the lower portion of the casing, a longitudinally movable marking element above the disk and adapted to move downwardly into engagement therewith to mark the same, means for mounting said element to undergo universal movement within the casing whereby its position relative to the center of the disk is controlled by gravity, magnetic means acting upon the element for normally holding the marking element above and spaced from the disk, means for removing the element from the magnetic influence of said magnet whereby said element may drop by gravity into engagement with the disk to mark the same in accordance with the position of said element, and frictional means engaging the marking element for preventing accidental displacement of the element from the magnetic influence of the magnet.

FRED H. SCHMIDT.

REFERENCES CITED

The following references are of record in the file of this patent:

UNITED STATES PATENTS

| Number | Name | Date |
| --- | --- | --- |
| 1,977,630 | Hester | Oct. 23, 1934 |

FOREIGN PATENTS

| Number | Country | Date |
| --- | --- | --- |
| 197,801 | Germany | Apr. 28, 1908 |
| 2,781 | Great Britain | Feb. 5, 1906 |